Nov. 27, 1962 L. J. TIMBERS 3,065,827
WHEEL CHOCK
Filed Aug. 22, 1960

INVENTOR.
LAWRENCE J. TIMBERS
BY
for Watts, Edgerton, Pyle & Fisher
ATTORNEYS

United States Patent Office 3,065,827
Patented Nov. 27, 1962

3,065,827
WHEEL CHOCK
Lawrence J. Timbers, 343 Clarmont Road,
Willowick, Ohio
Filed Aug. 22, 1960, Ser. No. 50,938
5 Claims. (Cl. 188—32)

This invention pertains to wheel chocks and more particularly to that type of wheel chock which is primarily suited for use with trucks and other road vehicles.

In modern industrial installations, truck loading docks are usually provided. The docks are normally elevated with respect to a driveway a height which is approximately equal to the height of beds of trucks and trailers. Trucks are backed up adjacent or against such docks for loading and unloading. An adjustable ramp known as a dock board is then extended from the dock to the bed of each truck to bridge any space gap there may be between the truck and dock. The dock boards also accommodate any differences in height between the bed of the truck and the dock and any unlevel condition.

Once a truck is positioned for a loading or for an unloading operation, it is important it be maintained in that position. The truck may tend to roll from the position, especially if a fork lift truck or similar apparatus is being used in the loading or unloading operation. Wheel chocks are used to hold the truck or trailer in its selected position.

A chock made in accordance with this invention is a fabricated steel device which has a pair of spaced triangular side plates and cross members maintaining them in appropriate spaced relationship. The triangular side plates are preferably in the form of an equilateral triangle. Relatively large and tubular cross members are welded to each of the plates at each end of the base of a triangle. A smaller and preferably square cross member is welded to the plates adjacent the apexes of the triangles.

With the construction briefly described above the chock is both light-weight and strong. It is highly portable and it is reversible. More important, if it is properly proportioned, it has a self-locking action.

This self-locking action is obtained because if the wheel overrides the small cross member it then drops into a space between one of the tubular cross members and the small cross member. As the wheel presses against the larger cross member it tends to cause the chock to pivot about a base corner. This pivoting brings the smaller cross member up against the base of the wheel. Since the wheel is over the smaller cross member, the entire weight of the vehicle is applied directly down on it to inhibit and prevent the pivoting action. Thus, with this construction, when a truck or trailer attempts to roll, it is not simply a matter of rolling a wheel up an inclined plane to override the chock, but rather, a matter of applying enough force to the truck to lift the weight imposed on the chocked wheel.

Accordingly, one of the principal objects of this invention is to provide a novel and improved wheel chock which is self-locking when a vehicle tends to attempt to override it.

Another object of this invention is to provide a novel and improved extremely strong and light-weight wheel chock.

Another object of this invention is to provide a novel and improved wheel chock which includes a pair of spaced plates shaped to define isosceles triangles with a pair of relatively large cross members welded to the plate adjacent the opposite ends of the base of the triangles and a relatively small cross member welded to the plates adjacent the apexes.

Another object of this invention is to provide a wheel chock made in accordance with the foregoing objectives in which a chain is fixed to one of the side plates of the wheel chock.

Other objects and a fuller understanding of the invention may be had by referring to the following specification and claims, taken in conjunction with the accompanying drawings, in which:

Figures 1, 2:
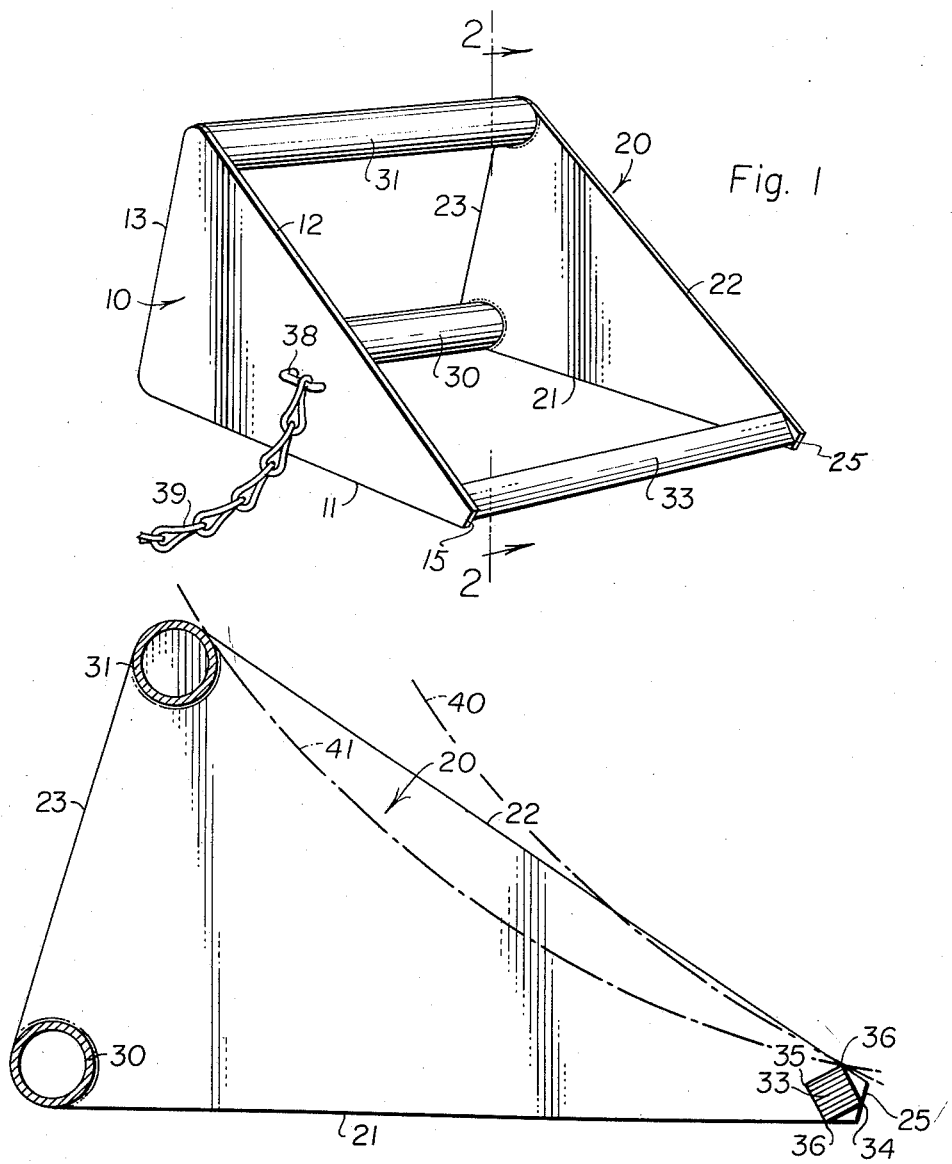
FIGURE 1 is a respective view of the device.
FIGURE 2 is a sectional view as seen from the plane indicated by the line 2—2 of FIGURE 1 and on an enlarged scale with respect to FIGURE 1.

Referring to the drawings and to FIGURE 1 in particular, a pair of spaced side plates 10, 20 are provided. The side plates are each relatively thin steel members cut to a triangular configuration. The plates 10, 20 are each in the form of an isosceles triangle having side edges 11, 12 and 21, 22 respectively. The side edges are of equal length and each are longer than base edges 13, 23.

A pair of tubular relatively large and cylindrically contoured cross members 30, 31 are provided. The cross members 30, 31 are welded at opposite ends to both of the plates. In each case the cross members are disposed substantially normal to the plates and welded to them adjacent an end of the base edges 13, 23. Preferably, and as shown, the cross members 30, 31 are positioned such that a side edge and the base edge is tangential to each. Thus, the side edges 11, 21 and the base edges 13, 23 are substantially tangential to the surface of the cross member 30. The side edges 12, 22 and the base edges 13, 23 are substantially tangential to the surface of the cross member 31.

The side edges 11, 12 and 21, 22 meet at apexes 15, 25 respectively which are preferably truncated as shown. The intersection of the side edges with the bases are also preferably truncated in each case as indicated in the drawings.

Adjacent the apexes 15, 25, a relatively small cross member 33 is provided. The cross member 33 is welded at its ends to the plates 10, 20 respectively. The cross member is preferably square as shown. With the square cross member opposite corners 34, 35 are each positioned such that they lie in a plane which passes through the apexes 15, 25 and bisects the triangles. The remaining corners 36 are positioned such that they terminate substantially at the side edges 11, 12 and 21, 22.

A U-shaped chain anchor 38 is welded to an outer face of one of the plates. In the drawings the anchor 38 is welded to the outer face of the plate 10. A chain 39 is secured to the remainder of the chock by this anchor 38. The chain is for tying the chock to a dock to prevent theft and accidental loss while still providing the requisite flexibility in positioning the chock where desired.

The phantom showings of a wheel at 40 and 41 underscore one of the outstanding advantages of this invention. Two of the side edges either 11, 21 or 12, 22 serve as base support edges. With the symmetry of design it can be either pair of edges. The edges 11, 21 are shown as the base edges. The chock is pushed under a wheel, usually until the relatively small cross member 33 abuts the wheel. In use, the cross member 31 is usually positioned near but normally not in abutment with the wheel. It will be recognized that sometimes, when the radius of the wheel is large, the wheel may abut the cross member 31 first, rather than the smaller cross member 33.

In normal operation the abutment is as shown with the relatively small member against the wheel. This relatively small member will usually inhibit truck movement. If the truck, however, rolls up over the small member 33 to the position shown in phantom at 41, the tire then abuts the cross member 31. Because of the proportioning of the chock with the base side edges 13, 23 substantially shorter than the long side edges, the smaller cross member 33 will be positioned under the wheel. Any continued rotation of the wheel after it abuts the member 31 will tend to cause the member 31 to move with the wheel. This movement of the member 31 is a rotation about a pivot point defined by the intersection of the base supporting side edges 11, 21 and the base side edges 13, 23 respectively. As the chock pivots about these intersections, the smaller cross member 33 is lifted against the wheel tending to attempt to lift the truck. The weight of the truck is so great that the truck cannot override the chock. If this truck is rolling accidentally and unattended then movement will be stopped. If a truck driver is attempting to pull a trailer or a truck away from the dock without first removing the chock he will find himself unable to do so especially if the chocks are properly installed under each side of the vehicle.

While the invention has been described with a great deal of detail it is believed that it essentially comprises a wheel chock composed of a pair of spaced and parallel triangular shaped side plates and three cross members each welded to each of the plates at a corner of the triangle.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A wheel chock comprising, a pair of spaced and parallel rigid steel side plates, each of said side plates having side and base edges defining an isosceles triangle with the base shorter than the sides, a pair of round steel tubular cross members each welded at either end to said plates adjacent the ends of the base edge of said isosceles triangle, a square cross member welded at its ends to the two plates adjacent the apex of each of said triangles and disposed with two of its side edges lying in a plane bisecting each of said triangles, said cross members being spaced and parallel and having axes defining another isosceles triangle symmetrical about such plane, and the corners of said triangular plates being truncated.

2. A wheel chock comprising first and second spaced and parallel steel plates of triangular configuration, said plates each having inner and outer faces, said plates each having a base edge and first and second upstanding side edges, the edges of each plate defining an isosceles triangle, each of said base edges having first and second ends, said side edges of each plate intersecting at an apex, a relatively small cross member of square cross section having four parallel side edges and first and second ends, the first end of the square cross member being welded to the first plate inner face adjacent the first plate apex, the second end of the square cross member being welded to the second plate inner face adjacent the second plate apex, said square cross member being normal to each of the plates and being disposed with two of said side edges disposed in a plane bisecting each of said triangular plates and passing through each of said apexes, first and second tubular relatively large cylindrically contoured cross members each having first and second ends, the first end of the first cylindrical cross member being welded to the first plate inner face adjacent the first end of the base edge thereof, the second end of the first cylindrical cross member being welded to the second plate inner face adjacent the first end of the base edge thereof, said first end of the second cylindrical cross member being welded to the first plate inner face adjacent the second end of the base edge thereof, said second end of the second cylindrical cross member being welded to the second plate inner face adjacent the second end of the base edge thereof, said first cylindrical cross member being positioned such that the first and base edges of both the first and second plates are substantially tangential thereto, the second cylindrical cross member being positioned such that the second and base edges of both the first and second plates are substantially tangential thereto, the cross members being spaced and parallel with one another and having axes defining another isosceles triangle disposed within the triangles defined by the plate edges and symmetrical about such plane bisecting said plate triangles, at least said cylindrical cross members being disposed within a triangular solid defined by the plate edges, the plates each being truncated at the apex thereof and at each of the ends of the base edges thereof, an anchor member welded to the outer face of one of said plates, and an anchor chain secured to the anchor member.

3. A wheel chock comprising first and second spaced and parallel steel plates of triangular configuration, said plates each having inner and outer faces, said plates each having a base edge and first and second upstanding side edges, the edges of each plate defining an isosceles triangle, each of said base edges having first and second ends, said side edges of each plate intersecting at an apex, a relatively small cross member of square cross section having four parallel side edges and first and second ends, the first end of the square cross member being welded to the first plate inner face adjacent the first plate apex, the second end of the square cross member being welded to the second plate inner face adjacent the second plate apex, said square cross member being normal to each of the plates and being disposed with two of said side edges disposed in a plane bisecting each of said triangular plates and passing through each of said apexes, first and second tubular relatively large cylindrically contoured cross members each having first and second ends, the first end of the first cylindrical cross member being welded to the first plate inner face adjacent the first end of the base edge thereof, the second end of the first cylindrical cross member being welded to the second plate inner face adjacent the first end of the base edge thereof, said first end of the second cylindrical cross member being welded to the first plate inner face adjacent the second end of the base edge thereof, said second end of the second cylindrical cross member being welded to the second plate inner face adjacent the second end of the base edge thereof, said first cylindrical cross member being positioned such that the first and base edges of both the first and second plates are substantially tangential thereto, the second cylindrical cross member being positioned such that the second and base edges of both the first and second plates are substantially tangential thereto, the cross members being spaced and parallel with one another and having axes defining another isosceles triangle disposed within the triangles defined by the plate edges and symmetrical about such plane bisecting said plate triangles, at least said cylindrical cross members being disposed within a triangular solid defined by the plate edges and, the plates each being truncated at the apex thereof and at each of the ends of the base edges thereof.

4. A wheel chock comprising first and second spaced side plates, each having side edges tapering from a wide end to a relatively narrow end, the plates being spaced from one another a distance greater than the width of a wheel to be chocked, an anchor cross member connected to both plates near the narrow end, base cross member means connected to the plates near the wide end and having spaced wheel abutment portions, said anchor member and such base member means being spaced from one another along opposite side edges of each plate, the anchor member and the abutment portions defining the ends of two spaced wheel receiving recesses bounded on their sides by the plate edges, whereby a wheel being chocked may project into such space and rest on the anchor member and pressure applied against such abutment portion will tend to lift the anchor member against the wheel thereby locking the wheel, and said chock being operably positionable with either of the wheel recesses oriented upwardly and the chock resting on the plate side edges remote from the upwardly oriented recess.

5. The device of claim 4 wherein the distance between said portions is substantially less than the distance between each of said portions and said anchor member.

References Cited in the file of this patent

UNITED STATES PATENTS

| | | |
|---|---|---|
| 2,182,044 | Ackerman | Dec. 5, 1939 |
| 2,184,487 | Clark | Dec. 26, 1939 |

FOREIGN PATENTS

| | | |
|---|---|---|
| 475,456 | Canada | July 24, 1951 |